(12) United States Patent
Jackson et al.

(10) Patent No.: US 8,528,665 B2
(45) Date of Patent: Sep. 10, 2013

(54) DRILLING WASTE MANAGEMENT SYSTEM

(75) Inventors: Dennis Jackson, Brighton, CO (US);
Fredrick Gillis, Mills, WY (US); Jason White, Fort Morgan, CO (US)

(73) Assignee: M-I L.L.C., Houston, TX (US)

( * ) Notice: Subject to any disclaimer, the term of this patent is extended or adjusted under 35 U.S.C. 154(b) by 322 days.

(21) Appl. No.: 12/896,461

(22) Filed: Oct. 1, 2010

(65) Prior Publication Data

US 2012/0080185 A1 Apr. 5, 2012

(51) Int. Cl.
*E21B 21/06* (2006.01)

(52) U.S. Cl.
USPC ............. 175/66; 175/206; 175/207; 210/241; 494/31

(58) Field of Classification Search
USPC .............. 175/66, 206, 207; 210/104, 170.01, 210/241, 253, 360.1, 744, 747.1, 781; 494/31, 494/32
See application file for complete search history.

(56) References Cited

U.S. PATENT DOCUMENTS

| | | | | |
|---|---|---|---|---|
| 6,808,626 | B2 * | 10/2004 | Kulbeth | 210/241 |
| 7,144,516 | B2 * | 12/2006 | Smith | 210/803 |
| 7,431,846 | B2 * | 10/2008 | Palmer | 210/710 |
| 2006/0105896 | A1 * | 5/2006 | Smith et al. | 494/7 |
| 2008/0230491 | A1 * | 9/2008 | Wick | 210/787 |
| 2008/0236896 | A1 * | 10/2008 | Ivan et al. | 175/217 |
| 2009/0178978 | A1 * | 7/2009 | Beebe et al. | 210/747 |

* cited by examiner

*Primary Examiner* — Giovanna Wright
*Assistant Examiner* — Richard Alker
(74) *Attorney, Agent, or Firm* — Andrea E. Tran; David J. Smith

(57) ABSTRACT

A mobile drilling waste management system including a trailer having at least one centrifuge and a solids catch tank receiving solids separated from drilling fluid by one or more of the centrifuges. And a method of reclaiming drilling fluid including pumping drilling fluid contaminated with solids onto a trailer, separating the contaminant solids from the drilling fluid with at least one centrifuge located on the trailer, directing the contaminant solids to a solids catch tank located on the trailer, and pumping the drilling fluid off of the trailer.

25 Claims, 5 Drawing Sheets

DRILLING WASTE MANAGEMENT SYSTEM

BACKGROUND OF INVENTION

In the process of drilling wells, wellbore fluids or drilling muds are pumped downhole from the well drilling platform. Often these drilling fluids lubricate the drill bit and carry away cuttings generated as the drill bit digs. The cuttings and other solids are carried in a return flow stream with the fluids up to the well drilling platform at the surface. The solids are typically small pieces of shale or rock. Once the drilling fluids and solids reach the platform, a "shale shaker" located on the platform is typically used to remove the solids from the drilling fluids so that the fluids may be reused.

But it is not always possible to separate all the solids from the drilling fluids with a shale shaker. Many times the solids are simply too small to be separated with a shaker. Generally, the shale shakers are only able to separate 60-70% of contaminant solids from drilling fluids. Additionally, drilling fluids are frequently formulated to contain finely ground solid additives that a shaker cannot distinguish from fine drilling solids, known as low gravity solids. Barite, a well know weighting agent, is one example of such solid additives. When shakers alone are insufficient, additional drilling waste management equipment is often used to further separate the solids from the drilling fluid. Drilling waste management equipment generally refers to the pumps, tanks, and centrifuges that are capable of separating the fine drilling solids from the drilling fluid. Without this additional treatment, the solids-contaminated drilling fluid cannot be re-used and must be discarded.

Drilling waste management systems incorporating the waste management equipment are effective for separating the fine solids from the drilling fluid and returning the fluid to the drilling rig. Unfortunately, existing drilling waste management systems are complicated and expensive to install at the rig site. These systems arrive in pieces that must be shipped to the rig site in multiple truckloads. A crane and its crew are necessary to lift the pieces from the truck trailer and place them at the rig site. Once the pieces are in place, the components of the drilling waste management system must be interconnected by skilled personnel. When the drilling operation is complete, the system must then be disassembled with a crane and shipped offsite in multiple truckloads. The shipping costs, crane rental costs, and labor costs associated with these operations are significant.

In addition to the expenses related to existing drilling waste management systems, the space requirements of these systems are another drawback. Existing systems need a relatively large amount of space at the rig site. The equipment itself has a significant footprint. Also, the cranes and trucks involved in shipping and assembly need additional space to maneuver. This is a significant drawback because drilling rig sites are becoming smaller and space is at a premium.

The safety of existing drilling waste management systems is also a concern. There is inherent danger associated with operating cranes, lifting heavy equipment, maneuvering trucks, and installation labor, e.g. welding. The assembly required by existing drilling waste management systems increases the likelihood that accidents may occur.

Consequently, there is a need for an improved drilling waste management system that reduces and/or eliminates the need for multiple delivery truckloads of equipment, crane operations, and assembly labor. There is also a need for a drilling waste management system that minimizes the drilling rig space necessary to setup and operate the system.

SUMMARY OF INVENTION

In one aspect, embodiments disclosed herein relate to mobile drilling waste management system that includes a trailer. In one embodiment the trailer includes an inlet configured to receive fluids from a drilling rig, at least one centrifuge in fluid communication with the inlet, a solids catch tank receiving solids separated by at least one of the centrifuges, and an outlet in fluid communication with the centrifuge.

In one aspect, embodiments of the method disclosed herein relate to reclamation of solids-contaminated drilling fluids. One embodiment of the method includes pumping drilling fluid contaminated with solid onto a trailer, separating the contaminant solids from the drilling fluid with at least one centrifuge located on the trailer, directing the at least a portion of separated solids to a solids catch tank located on the trailer, and pumping the drilling fluid off of the trailer.

Other aspects and advantages of the invention will be apparent from the following description and appended claims.

DETAILED DESCRIPTION

In one aspect, the embodiments disclosed herein relate to a mobile drilling waste management system comprising a mobile trailer. In another aspect, the trailer may include the centrifuges, pumps, tanks, piping assemblies, controllers, and other equipment necessary to reclaim drilling fluids contaminated with solids that cannot be removed by conventional "shale shakers" on the drilling rig.

Advantageously, by including the components onto a single trailer as described in the various embodiments, the solids-contaminated drilling fluid may be treated by positioning the trailer at the rig site and connecting the source of the contaminated drilling fluid to the trailer inlet. The mobile drilling waste management system of this invention thereby eliminates or reduces the need for multiple delivery loads, use of a crane to place the equipment, and complicated assembly of the system components. Thus, the mobile drilling waste management system of this invention may reduce the cost associated with reclaiming solids-contaminated drilling fluids and make the reclamation process safer.

Figure 1A:
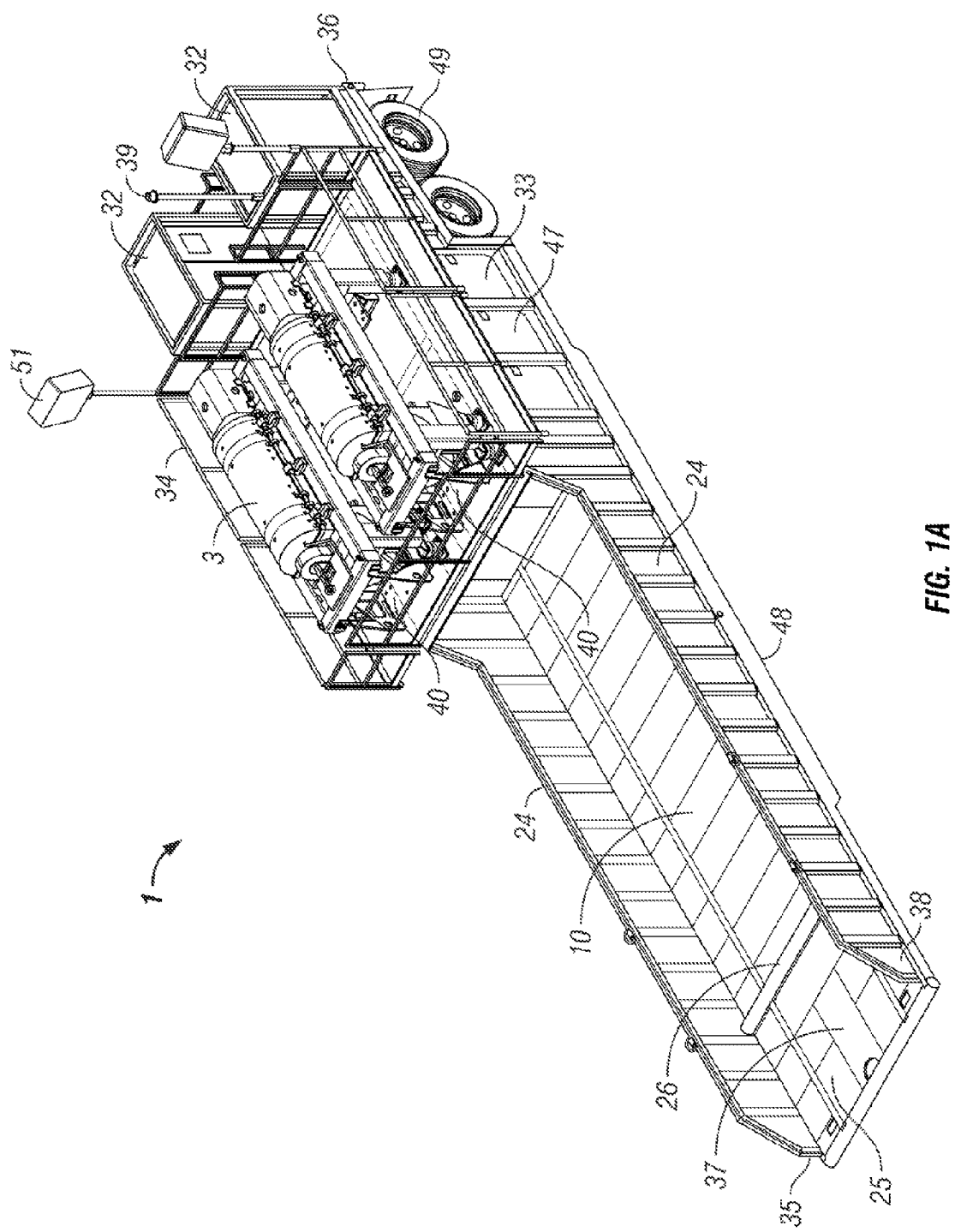
FIG. 1A shows an overhead view of one side of the drilling waste management system.
Figure 1B:
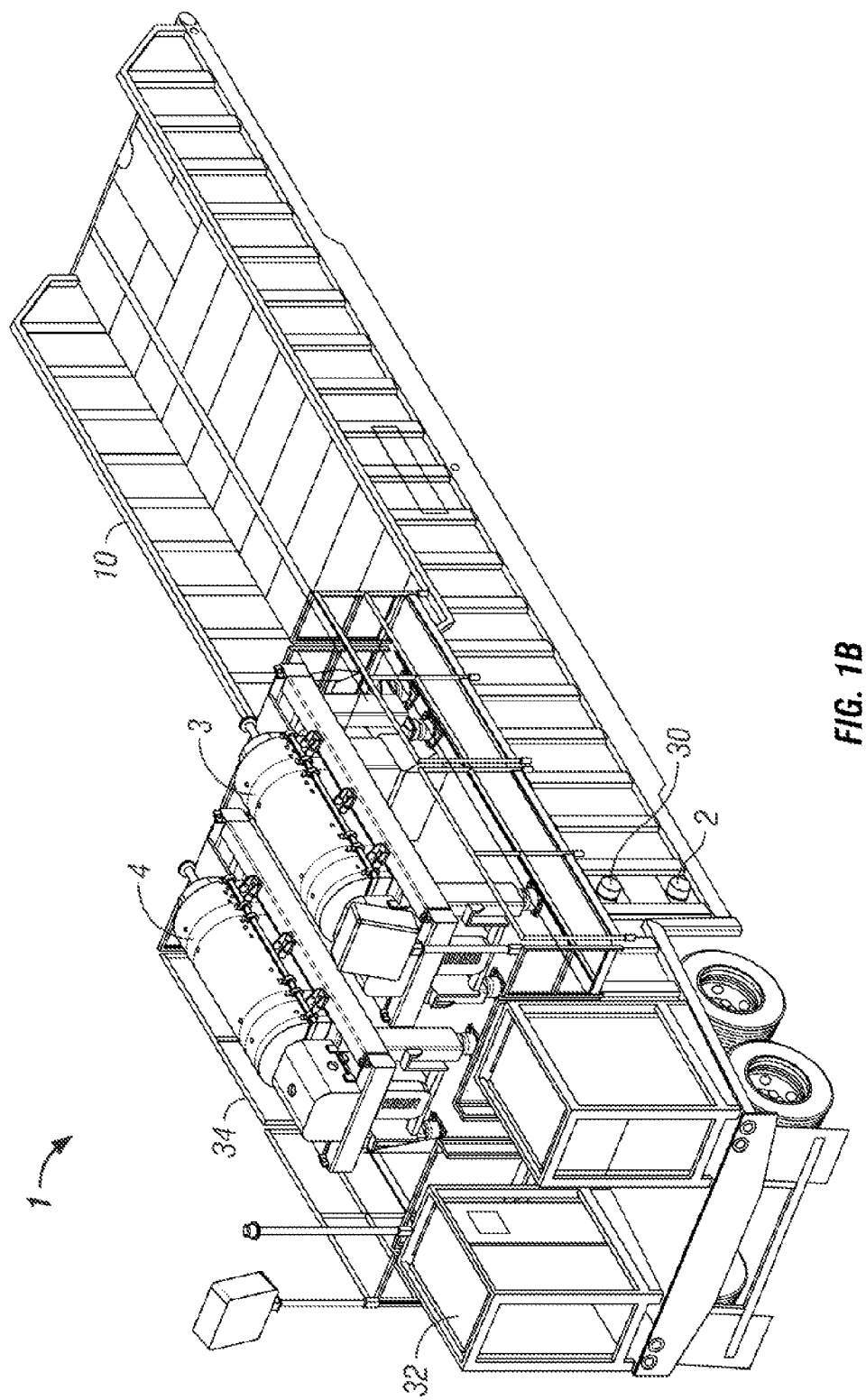
FIG. 1B shows an overhead view of another side of the drilling waste management system.

In a first embodiment, as shown in FIG. 1A and FIG. 1B, the drilling waste management system comprises a trailer 1. The trailer has an inlet 2 configured to receive fluids from a drilling rig, at least one centrifuge 3 in fluid communication with the inlet 2, and a solids catch tank 10. The solids catch tank 10 receives solids separated by one or more of the centrifuges 3. The trailer further includes an outlet 30 in fluid communication with one or more of the centrifuges 3. The reclaimed drilling fluid may be returned from the trailer for reuse via the outlet 30.

Figure 2:
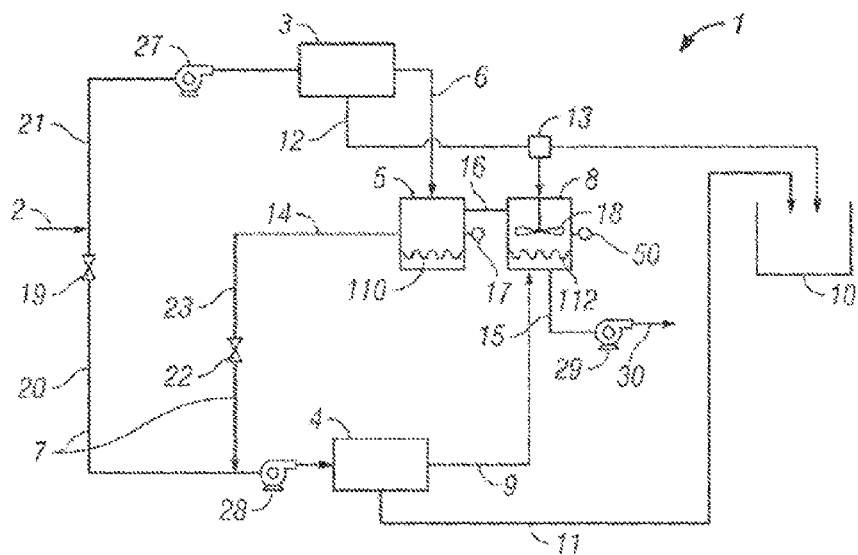
FIG. 2 is a flow diagram of some embodiments of the drilling waste management system.

In another embodiment, the trailer 1 comprises a first centrifuge 3 positioned on the trailer in fluid communication with the inlet 2 to receive the drilling fluids. A second centrifuge 4 is also positioned on the trailer 1. Referring to FIG. 2, the trailer may further include an effluent tank 5 which receives the liquid effluent 6 from the first centrifuge 3. A piping assembly 7 directs fluid to the second centrifuge 4. The piping assembly 7 may be configured so that the two centrifuges may work in parallel or series. In parallel operation, the piping assembly 7 directs drilling fluid from the inlet 2 to second centrifuge 4. In series operation, the piping assembly 7 directs fluid from the effluent tank 5 to the second centrifuge 4. A slurry tank 8 may be positioned on the trailer to receive the liquid effluent 9 from the second centrifuge 4. The trailer also comprises a solids catch tank 10. The solids catch tank 10 receives the solids 11 separated by the second centrifuge 4. The solids 12 separated by the first centrifuge 3 may be directed to either solids catch tank 10 or the slurry tank 8 by a switch 13.

The inlet 2 of the waste management system may be a pipe end or fitting where a pipe or hose can be connected. The drilling rig's drilling waste storage or drilling waste outlet may be connected to the inlet 2 via the pipe or hose to allow solids-containing drilling fluid pumped onto the trailer for treatment.

The centrifuges 3, 4 separate drilling cuttings and other solids from the drilling fluid to allow the drilling fluid to be recycled or removed from the drill site. The centrifuges may be any type or brand of centrifuge that is known to be useful for separating solids from fluid. In some embodiments, the centrifuges may be a variable-frequency drive centrifuge. One example of a centrifuge that may be suitable for use in the present invention is the CD500 available from M-I L.L.C. of Houston, Tex. The solids fractions separated by the centrifuges may be directed from the centrifuge to another location by one or more discharge chutes 40. The discharge chutes 40 may rely on gravity or a mechanical conveyor, such as a belt or auger, to move the solids away from the centrifuge. Optionally, one or more of the discharge chutes 40 may comprise a switch 13 to allow a user to select the destination of the solids.

When two or more centrifuges are utilized, the centrifuges may be operated in parallel or series. Series operation may be useful for recovering small solid additives, such as barite or other weighting agents. In one embodiment, during series operation, the first centrifuge 3 receives waste drilling fluid from the inlet 2. The first centrifuge 3 separates the drilling fluid into a first solids fraction 12 and a first effluent fluid 6. The first solids fraction 12 is directed to the slurry tank 8, and the first effluent fluid 6 is directed to the effluent tank 5. The first solids fraction 12 may include weighting agents, such as barite, or other solid additives. The fluid 14 in the effluent tank 5 is then pumped to the second centrifuge 4. In the second centrifuge 4, the fluid 14 is separated into a second solids fraction 11 and second effluent fluid 9. The second solids fraction 11 is directed to the solids catch tank 10. The second solids fraction 11 may comprise the low gravity solids such as drilling fines, which, in most cases, should be removed from the drilling fluid before re-use. The second effluent fluid 9 is directed to the slurry tank 8. The second effluent fluid 9 and the first solids fraction 12 may be mixed in the slurry tank 8 to produce recycled drilling fluid 15 that may be suitable for re-use in the drilling rig or removal for re-use at another site.

Alternatively, during parallel operation, drilling fluid may be directed to both the first centrifuge 3 and the second centrifuge 4. The first centrifuge 3 separates the drilling fluid into a first solids fraction 12 and a first effluent fluid 6. The first solid fraction 12 is directed to the solids catch tank 10 by the switch 13. The first effluent fluid 6 is directed to the effluent tank 5. The second centrifuge 4 separates the drilling fluid into a second solids fraction 11 and a second effluent fluid 9. The second solids fraction 11 is directed to the solids catch tank 10. The second effluent fluid 9 is directed to the slurry tank 8.

The effluent tank 5 may be any tank suitable for containing drilling fluids. In one embodiment, the effluent tank 5 comprises an overflow 16 in fluid communication with the slurry tank 8. The overflow 16 may comprise any apparatus suitable to communicate fluid from the effluent tank to the slurry tank. For example, the overflow may be a notch, hole, or pipe positioned at a level in the effluent tank to allow fluid to flow out of the tank when the fluid reaches the level. In another embodiment, the effluent tank 5 comprises a liquid level monitor 17. The liquid level monitor 17 may be configured to read the liquid level in the effluent tank 5 and convey the reading to a programmable logic controller. Alternatively, the liquid level monitor 17 may be configured to alert the programmable logic controller when a liquid level is reached in the effluent tank. In some embodiments, the effluent tank 5 may optionally comprise heating coils 110, such as steam circulation coils. The coils may function to transfer heat to the effluent tank in cold weather.

The slurry tank 8 may be any tank suitable for containing drilling fluids. In one embodiment, the slurry tank 8 comprises an agitator 18. Optionally, the agitator 18 may be used to mix drilling fluid with barite or other solids separated by the first centrifuge during series operation to produce a recycled drilling fluid 15. The operation of the agitator may be initiated by a programmable logic controller when the drilling waste management system is in series mode. The slurry tank 8 may also include a liquid level monitor 50. In some embodiments, the slurry tank 8 may optionally comprise heating coils 112, such as steam circulation coils. The coils may function to transfer heat to the slurry tank in cold weather.

The piping assembly 7 comprises the piping, valves, and actuators necessary to direct fluid to the second centrifuge 4. In one embodiment, the piping assembly 7 may be configured to allow fluid to be directed to the second centrifuge 4 from either the inlet 2 or the effluent tank 5. This allows the second centrifuge 4 to be operated in parallel or series with the first centrifuge 3. In one embodiment, the piping assembly 7 comprises a first valve 19 in fluid communication with the inlet 2. The first valve 19 may be positioned on a branch 20 from a line 21 between the inlet 2 and the first centrifuge 3. The first valve 19 may be actuated to allow fluid flow between the inlet 2 and the second centrifuge 4 to be turned on or off. The piping assembly 7 further comprises a second valve 22 positioned on a line 23, allowing fluid communication between the effluent tank 5 and the second centrifuge 4. The second valve 22 may be turned off or on opposite the first valve 19, allowing fluid to flow from the effluent tank 5 to the second centrifuge 4 when the first valve 19 is in the off position.

Figure 5A:
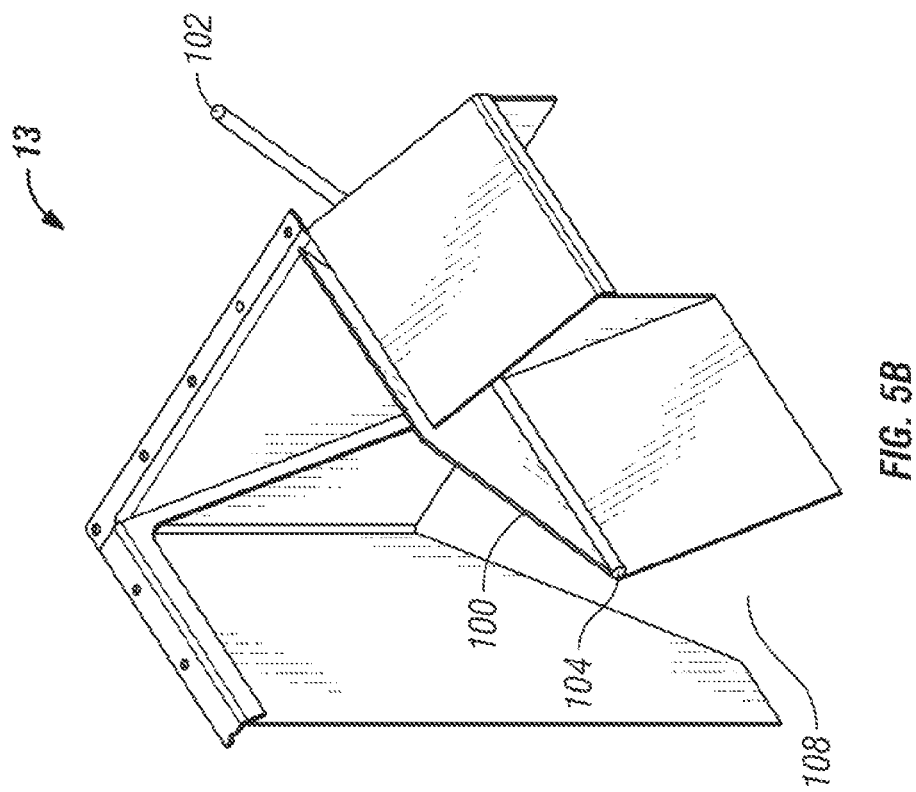
FIG. 5A shows a cutaway view of one embodiment of the switch in a first position.
Figure 5B:
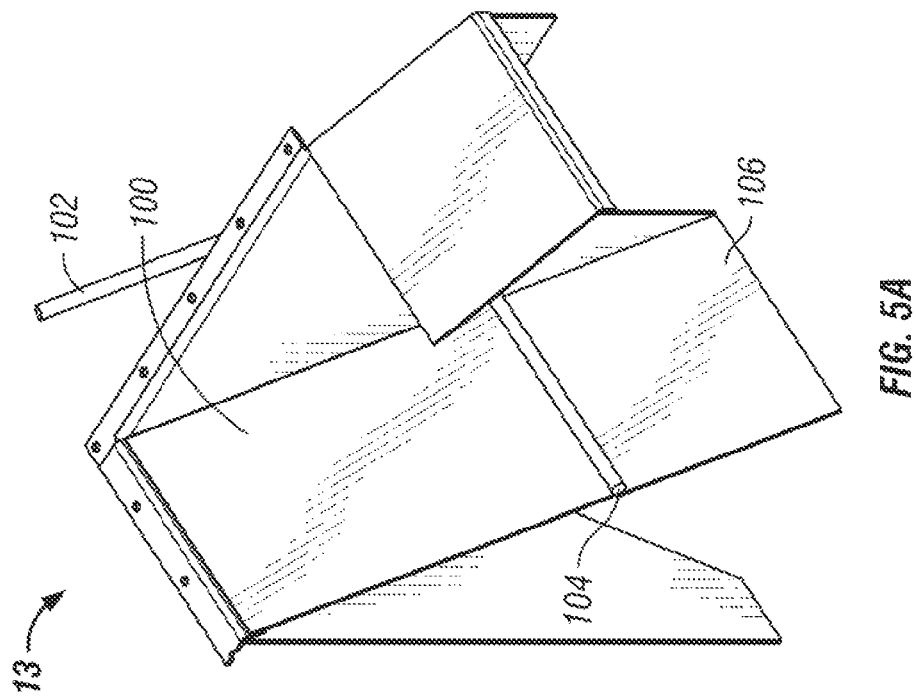
FIG. 5B shows a cutaway view of one embodiment of the switch in a second position.

The switch 13 is positioned to allow solids 12 separated by the first centrifuge 3 to be directed to either the solids catch tank 10 or the slurry tank 8. Referring to FIG. 5A and FIG. 5B, in one embodiment, the switch comprises a plate 100 and a handle 102 attached the plate 100. On one edge, the plate 100 is rotatable about a pin 104. This allows the user to position the plate 100 so that solids falling from the outlet of the first centrifuge will be directed to a discard chute 106 to the solids catch tank as shown in FIG. 5A. Alternatively, as shown in FIG. 5B, the plate 100 may be positioned to direct solids falling from the first centrifuge to a chute 108 flowing to the slurry tank. This exemplary embodiment of the switch may be manually operated. However, it should be readily apparent to persons of ordinary skill in the art that other embodiments of the switch may be mechanically driven by a motor, solenoid or other such apparatuses.

Referring to FIGS. 1A and 1B, the solids catch tank 10 may be a container of any configuration suitable to hold the solids separated by one or more of the centrifuges. In one embodiment, the solids catch tank 10 comprises a portion of the trailer 1. Walls 24 positioned on the trailer 1 form the solids catch tank 10. In another embodiment, the solids catch tank 10 comprises an opening 25. The opening 25 allows vehicles, such as front end loaders, to drive into the solids catch tank 10 to pick up and remove the solids for disposal. The solids catch tank 10 may also include a liquid barrier 26 to prevent liquids from flowing out of the tank at the opening. In some embodiments, the liquid barrier may be a raised wedge, semi-cylindrical bump, or weir on the trailer.

Referring to FIG. 2, the trailer 1 may also comprise one or more pumps. In one embodiment, a first feed pump 27 is configured to feed fluid from the inlet 2 to the first centrifuge 3. In another embodiment, the trailer 1 may further comprise a second feed pump 28 configured to feed fluid directed by the piping assembly 7 to the second centrifuge 4. When the piping assembly 7 is in the series mode, the second feed pump 28 draws drilling fluid from the inlet 2 to the second centrifuge 4. When the piping assembly 7 is in the parallel mode, the second feed pump 28 draw fluid from the effluent tank 5 to second centrifuge 4. In still another embodiment, the trailer may further comprise an effluent pump 29. The effluent pump 29 is configured to pump fluid from the slurry tank 8 to an outlet 30 from the trailer.

The trailer 1 may also comprise a control system. In one embodiment, the control system comprises at least one programmable logic controller 32 (PLC). In a further embodiment, the control system comprises two or more programmable logic controllers. One example of a PLC suitable for use in the present invention is the CYCLONE control panel manufactured by M-I L.L.C. The control system may optionally include a wireless interface to allow the programmable logic controller to be accessed remotely via a local area network and/or the internet.

The PLCs may be programmed to control the pumps, valves, centrifuges, and other equipment on the trailer. For example, during series operation the control system may control the amount of fluid pumped by the second feed pump to the second centrifuge. In one embodiment, the PLC receives a measurement of the liquid level in the effluent tank from the liquid level monitor and controls the speed of the pump so that liquid level in the effluent tank is maintained at preset level. In some embodiments, the liquid level is maintained at about 60%-70% of the effluent tank capacity. In another embodiment, the PLC may monitor the liquid level in the slurry tank and control the speed of the effluent pump to maintain the liquid level in the slurry tank. In some embodiments, the liquid level in the slurry tank is maintained at about 60%-70% of the slurry tank capacity by the PLC.

In another embodiment of the control system, the PLC controls the rotational speed of the variable-frequency drive motors of the centrifuges. The PLC may control the speed of either the drive operating the centrifuge's bowl, the drive operating the centrifuge's screw conveyer, or both. Optionally, the rotational speed of the centrifuge drive may be controlled in response to the flow rate of the drilling fluid, the speed of one or more or the pumps, and/or the physical properties of the drilling fluid entering the centrifuges.

Figure 3:
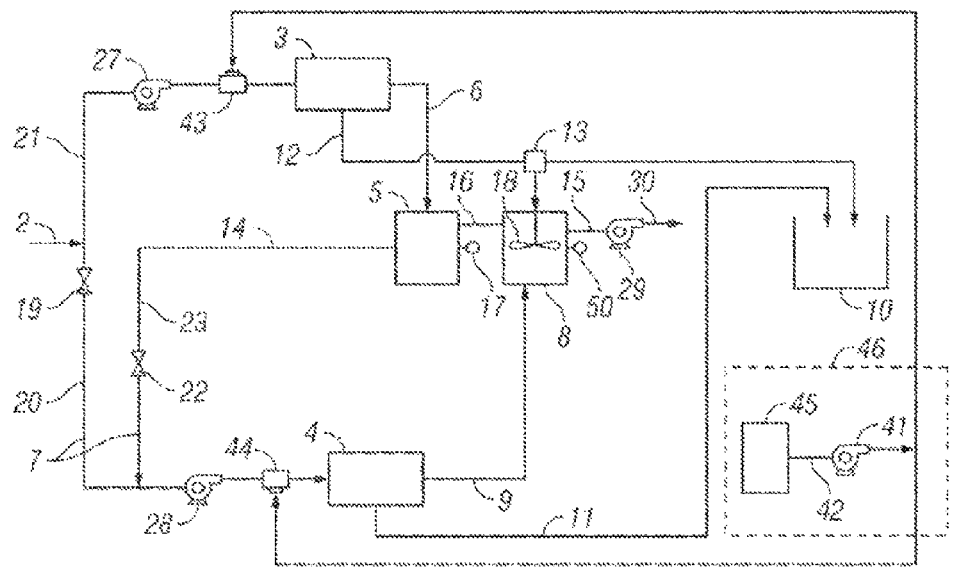
FIG. 3 is a flow diagram of some embodiments of the drilling waste management system including a dewatering system.

Referring to FIG. 3, in additional embodiment, the trailer may further include one or more static mixers 43 positioned upstream from the first centrifuge 3 and/or one or more static mixers 44 positioned upstream from the second centrifuge 4. When the drilling fluid is water-based, one or more of the static mixers 43, 44 may be used to mix water for dilution and/or dewatering chemicals with the drilling fluid. Alternatively, when the drilling fluid is a oil-based, one or more of the static mixer 43, 44 may be used to mix additional base oil with the drilling fluid. Diluting the drilling fluid with base oil may lower the viscosity of the drilling fluid, thereby enhancing solids separation.

In still another embodiment, the trailer may further comprise a dewatering system 46. The dewatering system 46 is comprised of the equipment necessary to add dewatering chemicals to the drilling fluid to enhance the separation of the solids from the drilling fluid. In one embodiment, the dewatering system may comprise one or more dewatering solution pumps 41 for feeding dewatering chemicals 42 to the contaminated drilling fluids received by the inlet. The dewatering solution may be added to the drilling fluids upstream from the first centrifuge 3 and/or the second centrifuge 4. Optionally, the dewatering system 46 may be in fluid communication with one or more of the static mixers 43, 44. The static mixers may be in fluid communication with the dewatering solution pump 41 and mix the dewatering chemicals 42 with the drilling fluid. In addition to dewatering chemicals, the dewatering process may sometimes include diluting the drilling fluid by adding water to the fluid before mixing the dewatering chemicals.

Without limitation to a particular mechanism, dewatering chemicals have the effect of coagulating and/or flocculating solids in the drilling fluid. Suitable dewatering chemicals are well known in the art. Examples of dewatering chemicals include, but are not limited to, coagulants like cationic polymers, anionic polymers, aluminum sulfate, ferric chloride, polyaluminum chlorides, calcium nitrate and lime. Further examples include, flocculant polymers such as MAGNAFLOC available from Ciba, HYPERFLOC available from Hychem, Inc., and PolyDADMAC. In some embodiments, a coagulant is first mixed with the drilling fluid and a flocculant is then added downstream. Optionally, the coagulant is added to the drilling fluid via a first mixer and the flocculant is added via a second mixer in series with the first. In such an arrangement, the coagulant and flocculent are pumped from separate sources by separate pumps. The dewatering chemical may be pumped from a source of dewatering chemicals located off of the trailer. Alternatively, the dewatering system may comprise one or more dewatering chemical solution tanks 45 positioned on the trailer.

Figure 4A:
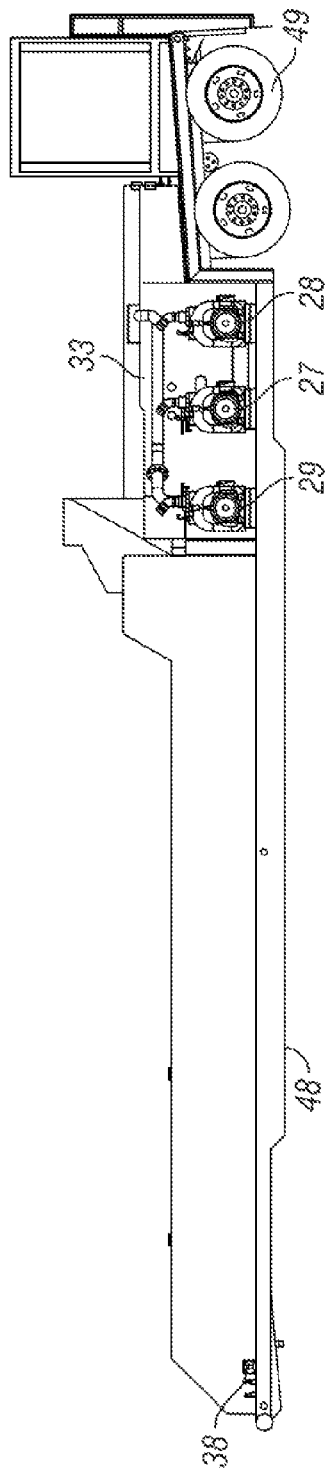
FIG. 4A is a cutaway view of one embodiment of the pump room of the drilling waste management system.
Figure 4B:
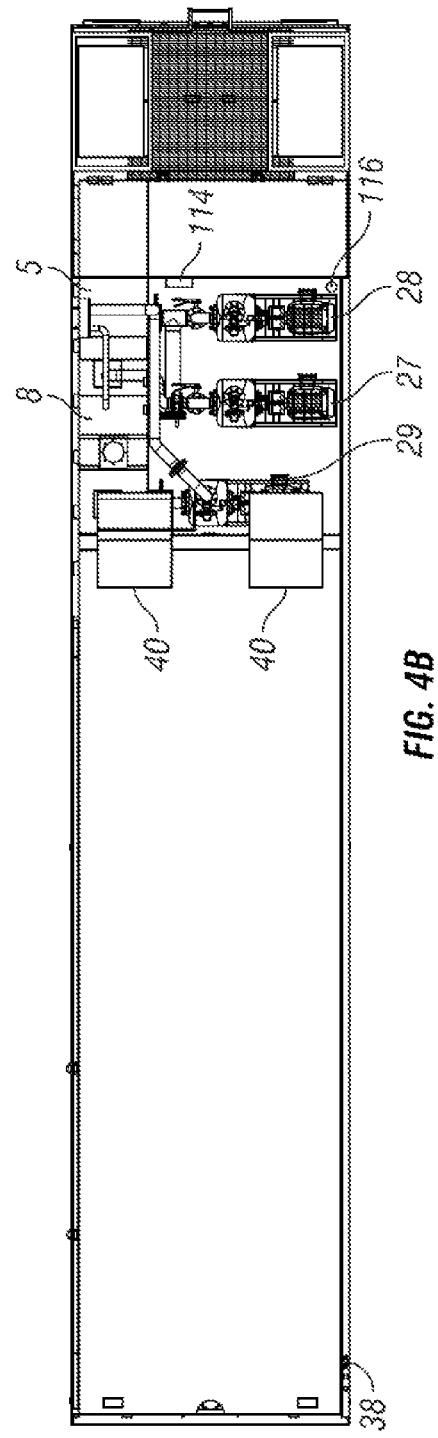
FIG. 4B is a top view of one embodiment of the pump room of the drilling waste management system.

Referring to FIG. 1A, the trailer 1 may comprise a pump room 33. As shown in FIG. 4A and FIG. 4B, the pump room 33 may enclose the first feed pump 27, second feed pump 28, and the effluent pump 29. The pump room may also enclose the effluent tank 5 and the slurry tank 8. The pump room 33 may also comprise doors 47. Optionally, a heater 114 may be included in the pump room. Advantageously, the heater 114 may prevent cold weather from interfering with the operation of the pumps and tanks. In one embodiment, the pump room 33 may also function to contain any spills that may occur. At least one drain 116 may be positioned in the pump room 33 to allow any spilled fluids in the pump room to be drained and captured.

Referring to FIG. 1A and FIG. 1B, in some embodiments, a raised platform 34 may be positioned on the trailer 1. The platform 34 may support the first centrifuge 3 and the second centrifuge 4. The platform 34 may be located above the pump room 33. In one embodiment, the first centrifuge 3 is located on the platform 34 above the slurry tank 8 in the pump room 33. The solids separated by the first centrifuge 3 may be directed by the switch 13 to fall by gravity into the slurry tank 8 below or into the solids catch tank 10. The effluent tank 5 may be positioned adjacent the slurry tank 8 in the pump room to allow fluid to flow from the effluent tank 5 to the slurry tank 8 via the overflow 16. Optionally, both the pump room 33 and the platform 34 may be positioned toward the back end 36 of the trailer 1. And, the front end 35 of the trailer 1 may comprise the solids catch tank 10.

The trailer 1 may be configured to be towed behind a conventional semi truck or other large truck. The trailer may also be configured to allow the front end 35 of the trailer 1 to rest of the ground when the trailer is in place at the rig site. This allows vehicles to be able to drive onto the trailer 1 and into the solids catch tank 10 to remove the separated solids. The trailer's wheels 49 may be inset so that the underside 48 of the trailer 1 may be extend lower than the wheels 49 when the trailer is in a resting on the ground. Advantageously, this may allow the underside 48 to support the trailer's weight rather than the wheels 49 when the trailer 1 is in place at the rig site.

To prevent the trailer connections to the towing truck, such as the brake connections and lights, from being damaged or destroyed by the vehicles driving into the solids catch tank 10, the trailer connections may be positioned under a movable panel 37 on the trailer. The panel 37 should be strong enough to support heavy machinery which may drive over the panel. The movable panel 37 may be hinged or totally removable to allow access to the trailer connections. Alternatively, the trailer connections 38 may be positioned on or near the side of the trailer 1 and out of the path of any machinery that may drive onto the trailer.

An alarm 39 may be positioned on the trailer 1. The alarm may include a flashing light, a strobe light, colored light, and/or an audible alarm, such as a siren. The PLC 32 may be configured to activate the alarm when certain conditions are reached or an event occurs that requires the attention of the operator. Examples of events that may cause the alarm to be activated include, but are not limited to, fluid level in the tanks, spills in the pump room, mechanical problems with the pumps or centrifuges, or the loss of fluid flow.

One or more lights 51 may also be included on the trailer 1. The lights may illuminate the work areas trailer and the surrounding area to allow for safe night operation of the drilling waste management system.

In one aspect, the embodiments of the method detailed herein relate to reclaiming drilling fluids at drilling rig site. In another aspect, the embodiments of the method detailed herein relate to reclaiming drilling fluid with a mobile drilling waste management comprising a trailer positioned at the drilling rig site.

A first embodiment of the method of reclaiming drilling fluid comprises pumping drilling fluid contaminated with solids onto a trailer 1, separating the contaminant solids from the drilling fluid, capturing the contaminant solids in a solids catch tank 10 on the trailer 1, and pumping the drilling fluid off of the trailer 1.

In another embodiment, the method includes pumping drilling fluid onto a trailer 1. The trailer comprising an inlet 2 configured to receive fluids from a drilling rig, a first centrifuge 3 in fluid communication with the inlet, a second centrifuge 4, a slurry tank 8 receiving a liquid effluent from the second centrifuge 4, an effluent tank 5 receiving a liquid effluent 6 from the first centrifuge 3, a piping assembly 7 configured to direct either fluid from the inlet 2 or effluent tank 5 to the second centrifuge 4, a solids catch tank 10 receiving solids 11 separated by the second centrifuge 4, and a solids switch 13 capable of a directing solids 12 separated by the first centrifuge 3 to either the solids catch tank 10 or the slurry tank 8.

The method further comprises separating solids from the drilling fluid in the first and second centrifuges. Solids from the second centrifuge 4 are discarded in into the solids catch tank 10. The effluent fluid 6 from the first centrifuge 3 is directed to the effluent tank 5. The effluent fluid 9 from the second centrifuge 4 is directed to the slurry tank 8. The fluid 14 from the slurry tank 8 is pumped to an outlet 30 positioned on the trailer. In some embodiments, the method may also comprise controlling whether the piping assembly 7 will direct fluid from the inlet or the effluent tank 5 to the second centrifuge 4. For example, the operator may manually adjust the piping assembly's valves or the PLC may actuate the valves.

In one embodiment of the method, the two centrifuges are operated in series. In this embodiment, the method comprises pumping drilling fluid to the first centrifuge 3 and separating the drilling fluid in the first centrifuge into a first solids fraction 12 and a first effluent fluid 6. The first solids fraction 12 is directed to the slurry tank 8. The first effluent fluid 6 is directed to the effluent tank 5. Drilling fluid from the effluent tank 5 is pumped to the second centrifuge 4. The second centrifuge 4 separates the drilling fluid into a second solids fraction 11 and second effluent fluid 9. The second effluent fluid 9 and the first solids fraction 12 are mixed in the slurry tank 8 by an agitator, such as a propeller-type agitator. The method may further include activating the agitator 18 with a PLC when series operation of the centrifuges is selected by a user of the PLC control system. Optionally, the method may further include measuring the fluid level in the effluent tank and controlling the fluid level in the effluent tank by regulating the flow of fluid to the second centrifuge. For example, the PLC may be preset to maintain the fluid level in the effluent tank at 60%-70% of capacity and the PLC may be programmed to adjust the speed of the second feed pump 28 drawing fluid from the effluent tank 5.

In an alternative embodiment of the method, the centrifuges are operated in parallel. In this embodiment, the method includes controlling the piping assembly 7 to direct fluid from the inlet 2 to the second centrifuge 4. Drilling fluid from the inlet is pumped to both the first centrifuge 3 and the second centrifuge 4. In the first centrifuge 3, the drilling fluid is separated into a first solids fraction 12 and first effluent fluid 6. In the second centrifuge 4, the drilling fluid is separated into a second solids fraction 11 and second effluent fluid 9. Both the first solids fraction 12 and the second solids fraction 11 are both directed to the solids catch tank 10. The first effluent fluid 6 is directed to the effluent tank 5. The second effluent fluid 9 is directed to the slurry tank 8. In some embodiments, fluid from the effluent tank 5 is allowed to overflow into the slurry tank 8. Fluid from the slurry tank 8 is pumped to an outlet 30 positioned on the trailer 1. Optionally, the inlet flow rate of drilling fluid pumped onto the trailer 1 may be measured and fluid is pumped from the slurry tank 8 to the outlet 30 at about the same flow rate as the inlet flow rate. The PLC may be programmed to perform this operation by adjusting the speed of the effluent pump 29. Alternatively, the method may include monitoring the liquid level in the slurry tank 8 and controlling the speed of the effluent pump 29 to maintain the liquid level in the slurry tank 8. For example, the PLC may be preset to maintain the fluid level in the slurry tank at 60%-70% of capacity and adjust the speed of the effluent pump 29 accordingly.

In additional embodiments, the method may include positioning the trailer 1 adjacent to the shakers of the drilling rig and directing waste solids from the shakers into the solids catch tank on the trailer. In this way, the need is reduced or eliminated for separate solids catch tanks for the rig shakers and the mobile drilling waste management system centrifuges.

In some embodiments, the method may also include mixing dewatering chemicals with the drilling fluid upstream from one or more of the centrifuges. As previously discussed, dewatering may comprise mixing coagulants and/or flocculants with the drilling fluid prior to separating solids from the fluid in one or more of the centrifuges. These dewatering chemicals may be added via one or more static mixer positioned upstream of one or more of the centrifuges. Optionally, water may be added to the drilling fluid to dilute it before adding the dewatering chemicals. The dewatering process my further comprise controlling with a PLC, the flow rate of the dewatering chemicals added to the drilling fluid. The PLC may be programmed to control the flow rate of dewatering chemicals by adjusting the speed of one or more dewatering pumps in response to the flow rate of drilling fluid in the trailer. For example, the PLC may determine the flow rate of drilling fluid from flow meter positioned on the trailer or from the speed of one or more of the feed pumps on the trailer. Additional embodiments of the dewatering process are disclosed herein in the earlier discussion of dewatering.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A mobile drilling waste management system comprising:
a trailer, the trailer comprising:
an inlet configured to receive fluids from a drilling rig;
at least one centrifuge in fluid communication with the inlet, wherein the at least one centrifuge comprises a first centrifuge and a second centrifuge;
a solids catch tank, the solids catch tank receiving solids separated by one or more of the centrifuges;
an outlet in fluid communication with one or more of the centrifuges;
a slurry tank, the slurry tank receiving a liquid effluent from the second centrifuge; and
a solids switch capable of directing solids separated by the first centrifuge to either the solids catch tank or the slurry tank.

2. The system of claim 1 wherein the trailer further comprises: at least one effluent tank receiving a liquid effluent from the first centrifuge; a piping assembly for directing fluid to the second centrifuge, the piping assembly configured to direct either fluid from the inlet or effluent tank to the second centrifuge; and a feed pump configured to feed fluid directed by the piping assembly to the second centrifuge.

3. The system of claim 2 wherein the effluent tank comprises an overflow in fluid communication with the slurry tank.

4. The system of claim 2 wherein the effluent tank comprises a liquid level monitor electrically connected to a programmable logic controller.

5. The system of claim 1 wherein the trailer further comprises: an effluent pump configured to pump fluid from the slurry tank to the outlet.

6. The system of claim 1 wherein the trailer further comprises: a first feed pump configured to feed fluid from the inlet to the first centrifuge.

7. The system of claim 1 wherein the trailer further comprises a programmable logic controller electrically connected to one or more of the centrifuges.

8. The system of claim 1 further comprising a dewatering system comprising: one or more mixers positioned on the trailer upstream from one or more of the centrifuges; and a dewatering solution pump in fluid communication with the mixers, wherein the dewatering solution pump is configured to add dewatering chemicals to the drilling fluids upstream from one or more of the centrifuges.

9. The system of claim 1 wherein the solids catch tank comprises an opening configured to allow vehicles to enter the solids catch tank.

10. The system of claim 9 wherein the solids catch tank comprises a liquid barrier.

11. The system of claim 1 wherein the trailer further comprises a pump room enclosing one or more pumps.

12. The system of claim 1 wherein the pump room further comprises a heater.

13. The system of claim 1 wherein the trailer further comprises a raised platform supporting at least one of the first and second centrifuges.

14. The system of claim 1 wherein the trailer further comprises a warning alarm electrically connected to a programmable logic controller.

15. The system of claim 1 wherein slurry tank and an effluent tank further comprise a heating coil.

16. The system of claim 1 further comprising one or more static mixers positioned upstream from at least one of the centrifuges.

17. A method of reclaiming drilling fluid comprising: pumping drilling fluid contaminated with solids onto a trailer; separating at least a portion of the solids from the drilling fluid with at least one first centrifuge and one second centrifuge located on the trailer; directing the separated solids to a solids catch tank located on the trailer; and pumping the drilling fluid off of the trailer; wherein during the step of pumping said drilling fluid contaminated with solids onto the trailer, the trailer comprises: an inlet configured to receive fluids from a drilling rig; the first centrifuge in fluid communication with the inlet; an effluent tank receiving a liquid effluent from the first centrifuge; a piping assembly configured to direct either fluid from the inlet or effluent tank to the second centrifuge; a slurry tank, the slurry tank receiving a liquid effluent from the second centrifuge; the solids catch tank receiving solids separated by the second centrifuge; a solids switch capable of directing a solid separated by the first centrifuge to either the solids catch tank or the slurry tank; and a programmable logic controller; separating solids from the drilling fluid in the first centrifuge and the second centrifuge; discarding the solids from the second centrifuge into the solids catch tank; directing effluent fluid from the first centrifuge to the effluent tank; directing effluent fluid from the second centrifuge to the slurry tank; and pumping fluid from the slurry tank to an outlet positioned on the trailer.

18. The method of claim 17 wherein the method further comprises the step of: allowing fluid in the effluent tank to overflow into the slurry tank.

19. The method of claim 17 further comprising: controlling whether the piping assembly will direct fluid from the inlet or the effluent tank to the second centrifuge.

20. The method of claim 17 further comprising: pumping drilling fluid to the first centrifuge; separating the drilling fluid in the first centrifuge into a first solids fraction and a first effluent fluid; directing the first solids fraction to the slurry tank; directing the first effluent fluid to the effluent tank; pumping drilling fluid from the effluent tank to the second centrifuge; separating the drilling fluid into a second solids fraction and a second effluent fluid in the second centrifuge; and mixing the second effluent fluid and the first solids fraction in the slurry tank.

21. The method of claim 20 further comprising: measuring the fluid level in the effluent tank; and controlling the fluid level in the effluent tank by regulating the flow of fluid to the second centrifuge.

22. The method of claim 17 further comprising: pumping drilling fluid from the inlet to both the first centrifuge and the second centrifuge; separating the drilling fluid into a first solids fraction and a first effluent fluid in the first centrifuge; separating the drilling fluid into a second solids fraction and a second effluent fluid in the second centrifuge; directing the first solids fraction and the second solids fraction to the solids catch tank; directing the first effluent fluid to the effluent tank; directing the second effluent fluid to the slurry tank; overflowing fluid from the effluent tank to the slurry tank; and pumping fluid from the slurry tank to the outlet positioned on the trailer.

23. The method of claim 22 further comprising: measuring the inlet flow rate of the drilling fluid pumped onto the trailer; and pumping fluid from the slurry tank to the outlet at essentially the same flow rate as the inlet flow rate.

24. The method of claim 17 further comprising mixing dewatering chemicals with the drilling fluid upstream from at least one of the centrifuges.

25. The method of claim 17 further comprising positioning the trailer adjacent the shakers of a drilling rig and directing solids separated by one of the shakers to the solids catch tank on the trailer.

* * * * *